United States Patent [19]

Finzel et al.

[11] Patent Number: 5,069,523
[45] Date of Patent: Dec. 3, 1991

[54] CASSETTE FOR SPARE LENGTHS OF LIGHT WAVEGUIDES TO BE USED AT THE SITE TO BE SPLICED

[75] Inventors: Lothar Finzel; Monika Kreuz, both of Munich; Ernst Bachel, Geltendorf, all of Fed. Rep. of Germany

[73] Assignee: Siemens Aktiengesellschaft, Berlin & Munich, Fed. Rep. of Germany

[21] Appl. No.: 442,257

[22] Filed: Nov. 28, 1989

[30] Foreign Application Priority Data

Dec. 8, 1988 [DE] Fed. Rep. of Germany ....... 3841607

[51] Int. Cl.⁵ ................................................ G02B 6/36
[52] U.S. Cl. ...................................... 385/135; 385/95
[58] Field of Search ................ 350/96.20, 96.21, 96.22

[56] References Cited

U.S. PATENT DOCUMENTS

| 4,332,435 | 6/1982 | Post .................................. 350/96.20 |
| 4,765,708 | 8/1988 | Becker et al. .................... 350/96.20 |
| 4,798,432 | 1/1989 | Becker et al. .................... 350/96.20 |
| 4,812,004 | 3/1989 | Biederstedt et al. ............. 350/96.20 |
| 4,840,449 | 6/1989 | Ghandeharizadeh ............ 350/96.20 |

FOREIGN PATENT DOCUMENTS 3532313 3/1987 Fed. Rep. of Germany .
3532314 3/1987 Fed. Rep. of Germany .

Primary Examiner—Frank Gonzalez
Assistant Examiner—Phan T. Heartney
Attorney, Agent, or Firm—Kenyon & Kenyon

[57] ABSTRACT

A cassette for storing spare lengths of light waveguides with their splices is designed as a rotary splice cassette which includes a rotatable cover part. A splice holder that can hold a number of splices is attached to this cover part.

19 Claims, 2 Drawing Sheets

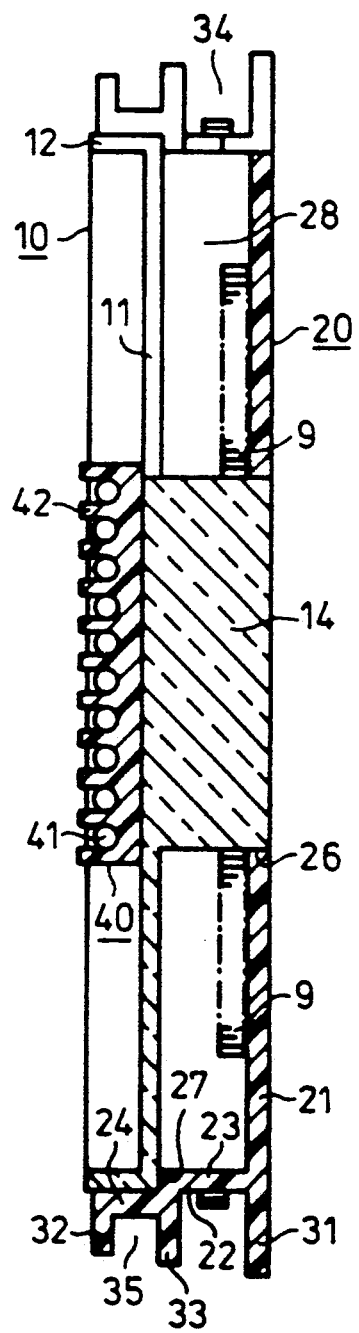
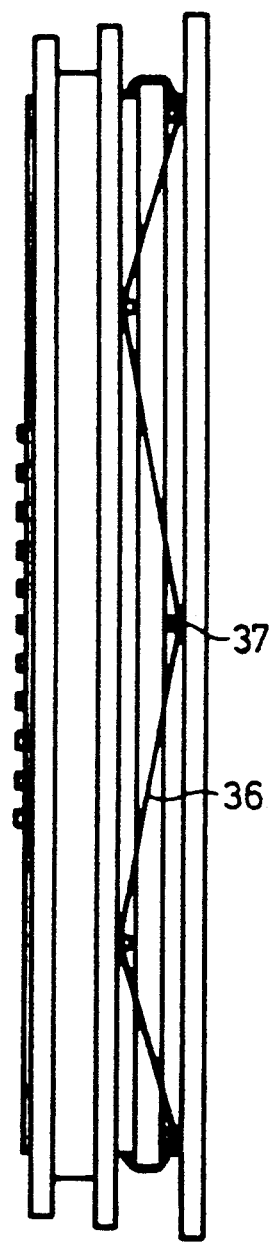
FIG 2
FIG 3

CASSETTE FOR SPARE LENGTHS OF LIGHT WAVEGUIDES TO BE USED AT THE SITE TO BE SPLICED

BACKGROUND OF THE INVENTION

The present invention relates to a cassette for spare lengths of light waveguides to be used at a site where waveguides are to be spliced which has a fixed part supporting the outer walls and a rotatable part with a core arranged therein.

A number of devices for storing spare lengths of light waveguides to be used at the splicing site are known already. Thus, for example, in DE-PS 27 21 300 a cassette provided with an annular take up region used for winding up spare lengths of light waveguides is described with which it is possible, if several turns of the respective optical fiber are loosely inserted, to pull this fiber out when needed, tightening the turns at the inner edge of the particular ring element; to splice the end of the optical fiber; to measure and test the piece of cable, and, after these operations, to reinsert the optical fiber into the cassette, without danger of damage.

In another known device (DE-OS 31 36 738), used for the separation and connection of individual light waveguides, a cable element at the entrance and/or exit of the device is provided. The waveguides are guided singly or in pairs between the comb teeth of this element. This arrangement prevents the waveguides from accidentally coming out of the comb teeth when installed. Between the comb elements are sorting compartments in which spare lengths of light waveguides can be stored.

Another known device (DE-OS 34 28 856) consists of a flat parallelepiped housing with an opening that can be closed by a cover in which the individual light waveguides can be inserted.

In a device disclosed in DE-OS 35 32 314, which incorporates an extremely flat design, a non-jamming withdrawal and reinsertion of one end of a waveguide is permitted. In order to accomplish this, a cylindrical magazine is provided with helical spirals in the flat cylindrical chamber, so that it is readily possible to withdraw and insert the waveguide in radially external spirals.

The known device in DE-OS 35 32 313 should also be mentioned, in which a magazine for this purpose consists of a fixed outer part that carries the outer edge wall and a winding part rotatable therein.

In all of the prior art cited, the devices are only suitable to store a single light waveguide or a light waveguide ribbon. A light waveguide ribbon is made up of several light waveguides joined together to form a flat cable.

In view of the limitations of the prior art devices, there is a need to improve such magazines by making them more suitable for handling in an installation on the site than the known magazines. Above all, the improved magazine should be able to store several light waveguides.

SUMMARY OF THE INVENTION

The present invention achieves these improvements by designing the cassette as a rotatable splice holder for a number of splices. By fastening the splice holder onto the rotatable part of the cassette, the simultaneous winding of a number of spare lengths of fiber coupled with their splices is possible for the first time. With such a device there is no need for an additional repository for the splicing devices.

A design of the invention is preferred wherein the cassette consists of two parts that form a cover part and a shallow bottom part which together enclose the storage space for the spare lengths of the light waveguides. Preference is given to a design in which the cover part is attached in a rotatable manner to the bottom part and which also accommodates the splice holder.

It is particularly advantageous if the cover part is connected to a cylinder body which protrudes into the space between the cover and bottom parts and which engages into a corresponding circular cutout in the bottom part. The cylinder body thus provides two essential functions. One, it determines the smallest radius of curvature of the light waveguides, and two, it forms the pivot of the rotatable cover part.

In order to simplify the threading of the light waveguides into the cassette and also to provide strain relief, a design is preferred in which the rotatable cover part has two guide slots directed approximately radially outward. Also, on the outer side of the cover part are provided guide members that have guiding surfaces approximately in the form of an arc. The waveguides to be accommodated in the cassette can be clamped near the guide members and the guide slots in such a way that strain relief of the waveguides is ensured.

Preferably, the guide members are circular, crescent-shaped or sector-shaped. Hold-down clamps are disposed at the guide members or adjacent to the guide members and at suitable positions on the cover part itself. They are provided in order to hold down the waveguides.

The bottom part of the cassette is preferably pot-shaped and consists of a bottom disk and a rim that is perpendicular to the disk. By dividing this rim into two stepped regions each with a different diameter, an approximately annular bearing surface is formed where they meet. This annular surface provides a guide on which the disk-shaped cover part can rest.

On the outer periphery of the bottom part, annular flanges are advantageously provided on the bottom disk. They are also provided on each of the two rim zones. Between these three flanges two grooves are formed. One of the grooves can take up the spare lengths of the light waveguides to be stored, so that the installer on the site can lay the cassette down at a certain distance from the actual installation location (rack or sleeve). The other groove may be designed so that it can be used in conjunction with lock elements of a sleeve box or with a rack.

It is particularly advantageous to equip at least one of the grooves with fixing aids which serve as strain reliefs for the spare light waveguides. Lastly, along the edge of the bottom part are slots for threading the spare waveguides so that they may be stored.

A particularly advantageous design in regard to the slots is one in which these slots are located in the uppermost of the two rims of the bottom part. It is thereby ensured that the spare waveguides to be withdrawn will easily slide over one another.

BRIEF DESCRIPTION OF THE DRAWINGS

FIG. 2 is a longitudinal sectional view through the cassette along line II—II in FIG. 1.

FIG. 3 is a side view of FIG. 2.

DETAILED DESCRIPTION

Figure 1:
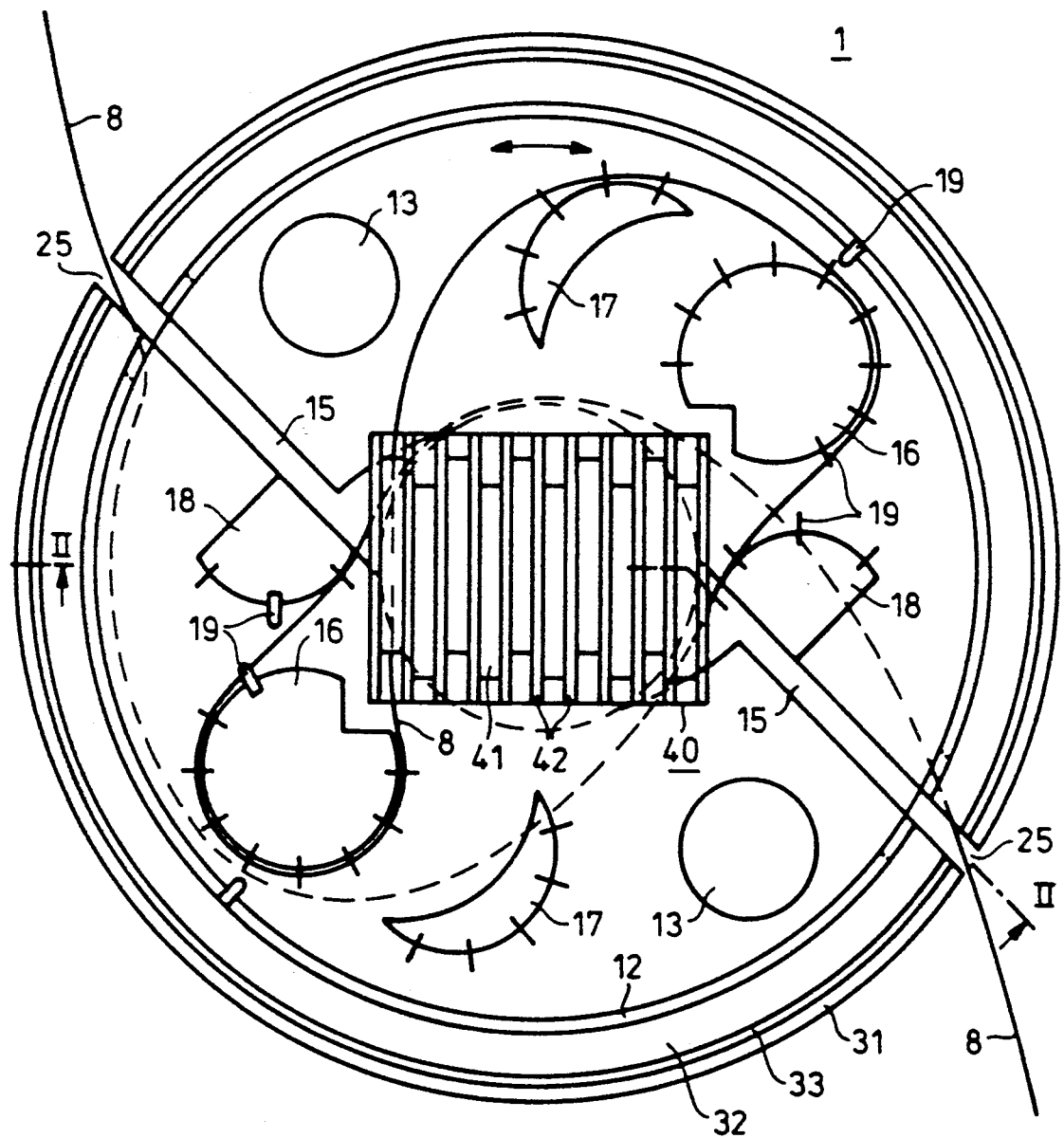
FIG. 1 is a top view of the top side of the rotary splice cassette.

The rotary splice cassette represented in the following embodiment can accommodate ten splices and thus 20 light waveguides. In order to clearly illustrate the embodiment, only two light waveguides are shown in FIG. 1. The two waveguides are connected by a splice, which is shown in the splice holder. Either-individual light waveguides 8 or so-called light waveguide ribbons 9 are used in the cassette. A waveguide ribbon consists of a number of waveguides joined together by a common coating to form a flat cable.

As seen in FIG. 2, the rotary splice cassette 1 consists of a cover part 10, which serves as the splice holder, and a pot-shaped bottom part 20 which forms the magazine 28 used to store the spare lengths 8 or 9. The bottom part 20 also supports the cover part 10. The cover part 10 is formed by a covering disk 11 which is made of transparent material and a flange type rim 12 which is perpendicular to the covering disk. On its inner side, the disk is connected to a cylinder body 14, which forms the pivot of the rotatable cover part 10 and also determines the smallest possible radius of curvature for the spare waveguides.

At the cylinder body 14 and/or at the periphery of a circular cutout 26 in the bottom part 20, locking elements of a known kind (not shown) are provided which make the connection of the cover part 10 with the bottom part 20 easily detachable.

In the cover part, two slots 15 are provided which are directed approximately radially outward. Additionally, on the outer side of the cover part 10 are two circular guide parts 16, two crescent-shaped guide parts 17, and two sector-shaped guide parts 18. All the guide parts have clamps 19 on their surface. In addition, two grip holes 13 are provided in the cover disk 11 at a location two-thirds of the way from the center in order to make the handling of the rotatable cover part easier.

The pot-shaped bottom part 20 consists of a bottom disk 21 and a stepped rim 22 that is perpendicular to the disk. The lower rim region 23 has a smaller diameter than the upper rim region 24. The location where the lower rim region 23 and the upper rim region 24 are joined serves as an annular bearing surface 27 on which the cover part 10 can rest. Slots 25 are provided in the upper rim region 24. In the bottom disk 21 a coaxial circular cutout 26 is provided in which the cylinder body 14 of the cover part 10 fits.

On the outer periphery of the bottom disk 21 is a bottom flange 31. Surrounding the upper rim region 24 is a top flange 32. An additional flange 33 is located between them. These three flanges, whose diameters differ in such a way that the bottom flange 31 has the largest diameter and the top flange 32 the smallest diameter, form two grooves 34 and 35. Groove 34 serves to receive spare lengths of either individual light waveguides 8 or light waveguides ribbons 9. The other groove 35 is provided as part of a device used to attach the rotary splice cassette to either sleeves or racks.

On the outer side of the cover part 10, in the center, is a rectangular splice holder 40, which can hold ten splices 41 and which has a plastic comb 42. The plastic comb 42 fastens the splices onto the splice holder in a known manner. In order to provide strain relief for the spare lengths of the light waveguides 8 or 9, a rubber O-ring 36 is provided which extends between the central flange 33 and the bottom flange 31, crossing several times. Pins 37 serve to guide the rubber O-ring.

DESCRIPTION OF THE OPERATION

After the Waveguides have been spliced, the splices 41 are deposited in the splice holder 40 of the cover part 10. They are freely accessible there at all times independent of their location in the splice holder and they can also be disassembled and re-opened or removed from the cassette altogether.

In order to insert either the light waveguides 8 or the light waveguide ribbons 9, the slots 15 of the cover part 10 must be made to register with the slots 25 of the bottom part 20. The spare waveguide ends are then introduced into the magazine 28 by rotating the cover part 10 counterclockwise. In so doing, the waveguides are wound onto the cylinder body 14 of the cover part 10. The rotatable top part 10 is then supported on the annular bearing 27 of the bottom part 20 and thus prevents the waveguides from getting into the gaps between the movable parts.

On the outer side of the rotatable cover part 10, the light waveguides are guided by a series of guide members 16 to 18 and clamps 19 in such a way that the minimum radius of curvature that they can withstand will not be exceeded, even in the case of an unintended sudden traction. The waveguides are guided between the two guide members 16 and 17 and by an additional guide member 18. As a result, a self-clamping is brought about. Between the end of the splice and the guide members, the waveguides are without guidance for a certain distance. In the case of the waveguide ribbons this distance permits these ribbons to undergo a rotation into a position parallel to the guide members.

The waveguides or waveguide ribbons are inserted into the annular magazine 28 by way of the slots 15 of the cover part 10.

If the two waveguides connected by a splice are of different lengths, the longer waveguide must be pushed into the magazine after the initial spooling. When this is done, it rests against the outer wall of the magazine and the cover part must then be rotated still farther so that the waveguide can be wrapped tightly around the cylinder body 14. The maximum difference in length between the two waveguides that can be taken up is determined by the product of the number of revolutions the waveguide undergoes and the maximum possible diameter of the waveguide turn. This value may be up to 400 mm. However, it may not be possible to easily push the longer waveguide or waveguide ribbon into the magazine if, as it passes through the outer rim slots 25, it becomes entangled with the waveguides already present in the magazine. In order to avoid this problem, the outer rim slots 25 are only provided in the upper rim region 24 and not in the lower rim region 23. Undesired deflections and loopings of the waveguides can be avoided during their introduction into the magazine if the cover part is made of a transparent material so that continuous observation of the described process is possible.

If a fiber is too short for the spooling process, it can be guided through the slots 15 of the cover part directly from the splices 41 without winding around the guide members. It is also possible to separate the cover part 10 from the bottom part 20. In both of these two cases, however, conventional spooling is no longer possible.

We claim:

1. In a cassette for holding excess lengths of light waveguides in a splice area comprising a fixed part supporting outer walls and a rotary part with a core connected thereto, the improvement comprising a splice holder mounted on said rotary part whereby the cassette forms a rotatable splice holder.

2. A cassette according to claim 1, comprising two superposed parts of low height forming respectively a cover part and bottom part of the cassette, said parts jointly enclosing an area forming a magazine for excess lengths of the light waveguides.

3. A cassette according to claim 2, wherein said cover part is rotatable with respect to said bottom part and has said splice holder mounted thereon.

4. A cassette according to claim 3, wherein said cover part includes a covering disk and a cylinder body connected thereto, said cylinder body protruding into an interior space between said covering disk and said bottom part and said bottom part has a circular cutout into which said cylinder body engages.

5. A cassette according to claim 4, wherein said rotatable cover part has two approximately radially directed guide slots formed in said covering disk, and further including, on the side of said covering disk, guide members with guiding surfaces approximately in the form of an arc of circle.

6. A cassette according to claim 5, wherein said guide members are of circular, crescent-shaped or sector-shaped design.

7. A cassette according to claim 6, and further including hold-down clamps arranged at the guide members and at positions on the covering disk of the cover part itself.

8. A cassette according to claim 2, wherein said bottom part is pot-shaped and comprises a bottom disk and a rim extending perpendicular thereto.

9. A cassette according to claim 8, wherein said rim is stepped, forming a lower rim region and an upper rim region connected in stepped manner through an approximately horizontal annular bearing surface.

10. A cassette according to claim 8, wherein said bottom part has upper and lower rim regions and three annular flanges which enclose between them two grooves, formed on the outer side of the bottom part in the region of the two rim regions.

11. A cassette according to claim 9, and further including three annular flanges, which enclose between them two grooves, formed on the outer side of the bottom part in the region of the two rim regions.

12. A cassette according to claim 11, wherein at least one of the grooves contains fixing aids providing strain relief for the excess lengths of the light waveguides.

13. A cassette according to claim 10, and further including slots in one of the rim regions of the bottom part.

14. A cassette according to claim 13, wherein said slots of the bottom part are formed in its upper rim region.

15. A cassette according to claim 9, and further including slots in one of the rim regions of the bottom part.

16. A cassette according to claim 15, wherein said slots of the bottom part are formed in its upper rim region.

17. A cassette according to claim 8, and further including slots in one of the rim regions of the bottom part.

18. A cassette according to claim 17, wherein said slots of the bottom part are formed in its upper rim region.

19. A cassette for holding excess lengths of light waveguides in a splice area comprising:
   a cover part;
   a pot-shaped bottom part having a bottom disk and a rim extending perpendicular thereto, said cover and bottom parts superposed to jointly enclose an area forming a magazine for excess lengths of the light waveguides, said cover part being rotatable in said bottom part;
   two approximately radially directed guide slots formed in said cover part;
   guide members disposed on said cover part; and
   a splice holder mounted on said cover part to form a rotatable splice holder.

* * * * *